Sept. 6, 1960           P. L. STONE           2,951,695

PIVOT

Filed March 14, 1957

*INVENTOR.*
PAUL L. STONE

BY *Arthur H. Swanson*

ATTORNEY.

United States Patent Office 2,951,695
Patented Sept. 6, 1960

2,951,695
PIVOT

Paul L. Stone, Meadowbrook, Pa., assignor to Minneapolis-Honeywell Regulator Company, Minneapolis, Minn., a corporation of Delaware Filed Mar. 14, 1957, Ser. No. 646,056

7 Claims. (Cl. 267—1)

This invention relates to a method of manufacturing an improved spring pivot and to the spring pivot resulting from said manufacture.

Another object of the present invention is the provision of a new and improved spring pivot which is inexpensive to construct and which permits a fairly large rotation of a shaft pivotally mounted thereon.

A better understanding of the present invention may be had from the following detailed description when read in connection with the accompanying drawing in which.

Figure 1:
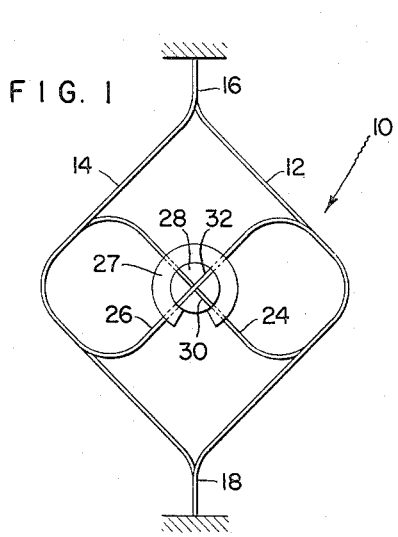
Fig. 1 is an end view of a spring pivot embodying the present invention, said spring pivot having mounted thereon a shaft.
Figure 2:
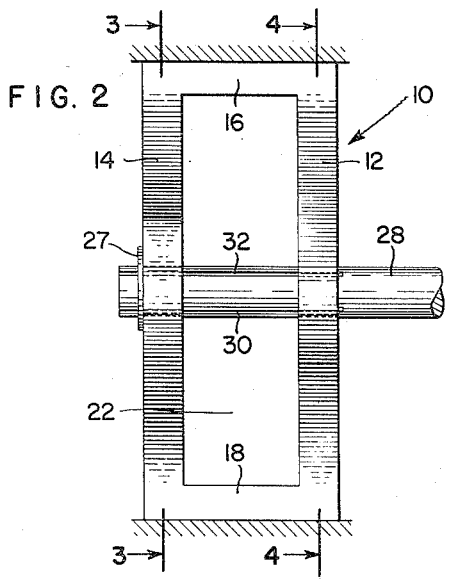
Fig. 2 is a side elevational view of the spring pivot and shaft shown in Fig. 1.

Referring now to the drawing in detail, the spring pivot is preferably made of a resilient material such as steel although other suitable resilient materials may be employed. Specifically, the spring pivot is made out of resilient sheet material such as sheet steel as will be described in more detail hereinafter.

Figure 3:
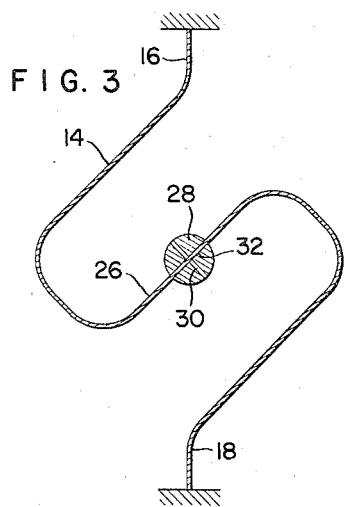
Fig. 3 is a sectional view taken along the line 3—3 of Fig. 2.
Figure 4:
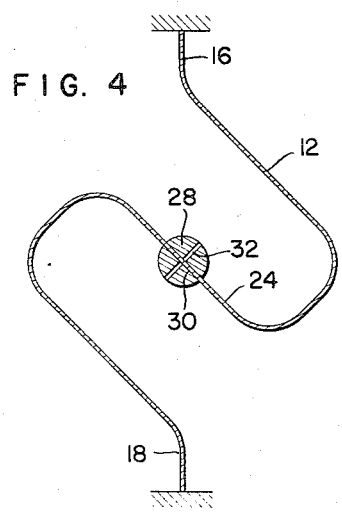
Fig. 4 is a sectional view taken along the line 4—4 of Fig. 2.

The spring pivot 10 comprises two spaced side portions 12 and 14 which are preferably integrally connected by two end portions 16 and 18 of a resilient sheet which has been formed in a manner to be described hereinafter. It will be understood that side portions 12 and 14 need not be integral but may be connected by suitable means. In order to space the two side portions 12 and 14 and the two end portions 16 and 18 of the sheet 10, sheet 10 is provided with a central aperture 22. The arms or portions 12 and 14 are both formed into S-shaped curves (see Figs. 3 and 4), the curves being relatively reversed. The central portions 24 and 26 of the side portions or arms 12 and 14 respectively, are angularly related to one another as shown in Fig. 1. The assembly when finally made and viewed from the end thereof as shown in Fig. 1, assumes the form of a hollow square with a figure eight extending thereacross.

Figure 5:
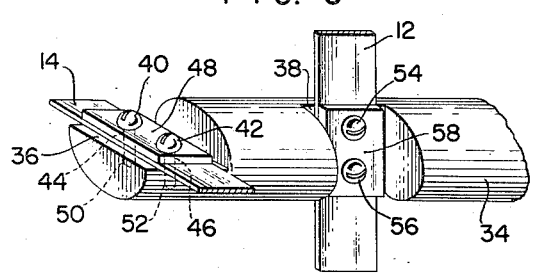
Fig. 5 shows an alternative way of attaching the pivot to that shown in Figs. 1–4.

The central portions 24 and 26 of the side arms or portions 12 and 14 of spring pivot 10 may be secured by welding, or by means of a spring clamp 27, to a shaft 28 so as to resiliently pivotally mount the shaft. As shown herein, the connection between the side portions 12 and 14 and the shaft 28 is effected by means of crossed slots 30 and 32 in the end of the shaft 28, which slots receive the central parts 24 and 26 of side portions 12 and 14, respectively. In lieu of slots 30 and 32, other suitable mounting means may be employed. For instance, in lieu of these slots in the shaft 28 a shaft 34 may be provided with "flats 36, 38" e.g. as shown in Fig. 5 which bear against the central portions of the side arms 12 and 14. In this latter mentioned arrangement the central portion of the side arm 14 as is shown in Fig. 5 is retained in a fixed position by means of screws 40, 42 that pass through apertures 44, 46 in a first retaining plate 48 and which screws are threadedly retained by the screw threads 50, 52 cut in shaft 34. The side arm 12 also shown in Fig. 5, is retained in similar fixed position by means of the screws 54, 56 that pass through apertures not shown in a second retaining plate 58 and screw threads not shown that are cut into the shaft 34. It should also be understood that other means such as welding may be employed to fixedly connect the side arms 12 and 14 to the apertured shaft 34.

It will be clear that the end portions 16 and 18 of pivot 10 must be relatively fixed to mount the pivot and thus resiliently pivotally mount the shaft. With the pivot end portions 16 and 18 so fixed and the shaft 28 mounted as shown in Figs. 1 through 4, the spring pivot 10 will provide balanced resilient resistance to rotation of the shaft 28 regardless of the direction of said rotation. Moreover, it has been found that substantial rotation in either direction is permissible up to the order of 45° away from the unstressed or neutral position.

The spring pivot 10 described above may readily be manufactured at a relatively inexpensive cost. For instance, a rectangular resilient sheet 10 having the outside dimensions shown in Fig. 2 may be punched to provide it with a central aperture 22 to thereby define the side portions 12 and 14 and the end portions 16 and 18 of the spring pivot. Thereafter, the arms 12 and 14 may readily be bent into the configurations shown in Figs. 3 and 4 as by placing them on a suitable form or, in the alternative, an automatic pressing machine may be employed to effect the 8-shaped bending required. Of course, if desired hand forming of the shape of arms 12 and 14 may also be used. These simple operations will yield the aforementioned highly desirable spring pivot.

The present invention thus provides a sheet metal flexible spring pivot of reversible S-shape configuration for a rotatable member that makes it possible to move such a member through a relatively large angle without changing the location of the axis about which the member is being rotated.

What is claimed is:

1. A spring pivot, comprising first and second resilient S-shaped members each being integrally connected to two stationary end members, said S-shaped members being disposed so that the S curves defined thereby are relatively reversed and each of said S-shaped members having a central portion fixedly connected to a shaft to provide a balanced resilient resistance to either a clockwise or counter clockwise rotation of said shaft.

2. A spring pivot, comprising first and second resilient S-shaped members each being integrally connected to two stationary end members, said S-shaped members being disposed in spaced side-by-side relation so that the S curves defined thereby are relatively reversed and each of said S-shaped members having a central portion fixedly connected to a shaft to provide a balanced resilient resistance to either a clockwise or counter clockwise rotation of said shaft.

3. A spring pivot, comprising first and second resilient S-shaped members, said S-shaped members being disposed in spaced side-by-side relation so that the S curves defined thereby are relatively reversed, said first and second members each having a central portion fixedly connected to a shaft to provide a balanced resilient resistance to either a clockwise or counter clockwise rotation of said shaft and fixedly mounted end means forming opposite end portions of each of said members, 4. A spring pivot, comprising two side members integrally connected to two end members, said side members being resilient S-shaped members with the S curves defined thereby being relatively reversed, the central portion of each of said side members being adapted to be connected to a shaft whereby to resiliently pivotally mount the shaft thereon.

5. A spring pivot, comprising a substantially rectangular sheet of resilient material having a substantially rectangular aperture in the center thereof whereby to define two spaced side portions integral with two spaced end portions, said side portions being in the form of S-shaped curves, said S-shaped curves being relatively reversed whereby the central portions thereof are disposed at angles to one another, said central portions being adapted to be connected to a shaft whereby to resiliently pivotally mount the shaft.

6. A spring pivot, comprising two side members integrally connected to two end members, said side members being resilient S-shaped members with the S curves defined thereby being relatively reversed, the central portion of each of said side members being fixedly positioned in slots in a shaft and means retaining each of said surfaces of said shaft forming each of said slots in fixed engagement with its associated central portions whereby to resiliently pivotally mount the shaft thereon.

7. A spring pivot, comprising two side members integrally connected to two end members, said side members being resilient S-shaped members with the S curves defined thereby being relatively reversed and the central portion of each of said side members being fixedly connected to a flat cut into a shaft to resiliently pivotally mount the shaft thereon.

References Cited in the file of this patent

UNITED STATES PATENTS

| | | |
|---|---|---|
| 517,106 | Laass | Mar. 27, 1894 |
| 1,060,146 | Urie | Apr. 29, 1913 |
| 1,243,503 | Frye et al. | Oct. 16, 1917 |
| 1,254,536 | Pursell | Jan. 22, 1918 |
| 1,302,306 | Carpenter | Apr. 29, 1919 |
| 2,793,028 | Wheeler | May 21, 1957 |